United States Patent [19]

Doerry et al.

[11] Patent Number: 4,726,057
[45] Date of Patent: Feb. 16, 1988

[54] ANSWER DETECTION METHOD AND APPARATUS FOR COIN TELEPHONE SETS

[75] Inventors: Armin W. Doerry, Noblesville; Dennis J. Noonan, Indianapolis, both of Ind.

[73] Assignee: AT&T Information Systems Inc. American Telephone & Telegraph Company, Murray Hill, N.J.

[21] Appl. No.: 890,194

[22] Filed: Jul. 28, 1986

[51] Int. Cl.⁴ .............................................. H01M 5/18
[52] U.S. Cl. .................................... 379/145; 379/132; 379/123
[58] Field of Search .............. 379/123, 132, 185, 146, 379/145, 36, 114, 131, 80, 91, 144; 235/380, 381; 340/825.71, 825.73

[56] References Cited

U.S. PATENT DOCUMENTS

| | | | |
|---|---|---|---|
| 2,301,363 | 11/1942 | Brock | 379/132 |
| 2,908,759 | 10/1959 | Peterson | 379/132 |
| 4,031,325 | 6/1977 | Dudonis et al. | 379/146 |
| 4,076,962 | 2/1978 | Streisand | 379/146 |
| 4,086,439 | 4/1978 | Vowles et al. | 379/145 |
| 4,122,308 | 10/1978 | Weinberger et al. | 379/131 |
| 4,277,650 | 7/1981 | Speno et al. | 340/825.71 |
| 4,296,277 | 10/1981 | Daneffel | 379/80 |
| 4,384,175 | 5/1983 | Brown | 340/825.73 |
| 4,484,035 | 11/1984 | Graham et al. | 340/825.71 |
| 4,563,681 | 1/1986 | Godard | 340/825.71 |

Primary Examiner—Robert Lev
Attorney, Agent, or Firm—Michael A. Morra

[57] ABSTRACT

A coin operated telephone station is provided with apparatus for detecting when a called party has answered a call (initiated at the coin operated telephone station) by the measurement of incoming signal energy on the telephone line. The apparatus includes hardware and software that cooperate in providing efficient and reliable detection of called party answer for the purpose of accurately charging telephone users. A microprocessor samples the output from each of three specialized energy detectors every 20 milliseconds to determine whether called party answer has occurred. The energy detectors include: (1) call progress tones in the frequency band 200-700 Hz approximately; (2) special information tones; and (3) broadband energy in the frequency band above 200 Hz. Additionlly, the time duration of the call progress tones and the quiet intervals between them are measured and used in the answer detection process. Signal energy from the calling party in the 200-700 Hz frequency band is filtered from the transmitting path by a 1200 Hz high-pass filter until called party answer occurs. Such filtering precludes a user from interfering with the detection process while permitting a limited amount of information to be tranmitted in the event that the answer detector is slow to operate.

15 Claims, 15 Drawing Figures

ANSWER DETECTION METHOD AND APPARATUS FOR COIN TELEPHONE SETS

TECHNICAL FIELD

This invention relates to answer detection apparatus for use in coin telephone equipment, and more particularly to a microprocessor-based system that determines when a called party answers based on telephone line signal energy measurements.

BACKGROUND OF THE INVENTION

Prior to a June, 1984 FCC decision, pay telephones were the exclusive province of the various Telephone Companies while others were precluded from the business of providing pay telephone service. Today, however, subject to state Public Utility Commission regulations, Customer Owned Coin Telephone (COCT) service is permitted, but a number of non-trivial technical challenges have been created including called party answer detection.

Coin telephones (pay phones) owned by the local Telephone Company generally utilize DC signals to signal called party answer. Such information is specially communicated between telephone central offices and then to the originating pay phone telling it when to accept the deposited coins. Such information, however, is not communicated to conventional telephones and it is only with great difficulty that called party answer can be detected. Naturally, the calling party knows when a connection is completed; but a knowledge of human frailty suggests that he not be relied upon to turn the "meter" on.

Complicating the problem of answer detection is the existence of special information messages that are provided when, for example, a telephone has been disconnected or a new telephone number has been assigned; and while certain tones are indicative of a proper answer, other tones are not. Ringing, busy and reorder signals as well as background noise and feedback from the calling party herself (sidetone) make answer detection a formidable challenge.

U.S. Pat. No. 4,122,308 suggests that a called party answer can be sensed by one or more of the following techniques: (i) detecting a line reversal signal, if available, (ii) detecting the presence of a voice on the telephone line, or (iii) sensing that a time has elapsed since the last ring which is greater than the time between rings and that no busy signal or dial tone has occurred. While each of these techniques has merit in general, when specifically applied to each of the various signal conditions potentially present on the telephone line, they do not offer sufficient accuracy, without more, to warrant use.

Whereas overcharging incurs the wrath of the calling party, undercharging angers the owner of the pay phone who ultimately pays for the call. Clearly there is little room for error in this field, especially in view of the history of accurate charging established by existing pay phones.

It is therefore an object of the present invention to provide accurate answer detection for pay phones in the absence of special signals from the local Telephone Company and without relying on the calling party to so indicate.

SUMMARY OF THE INVENTION

A pay telephone station is provided with apparatus for detecting when a called party has answered a call (initiated at the coin telephone station) by the measurement of signal energy present on the associated telephone line, the detection process being commenced for the purpose of accurate charging. The detection apparatus includes electronic circuitry for measuring the signal energy in the frequency band above 200 Hz to obtain an indication that call completion has occurred. The apparatus includes circuitry for inhibiting the indication of called party answer when a sequence of three predetermined tones are received; such tones generally precede an intercept message such as one that announces that a telephone number has been changed or disconnected. The apparatus further includes circuitry for inhibiting the indication of called party answer when call progress tones are detected. These tones reside in a frequency band extending from 200 Hz to approximately 700 Hz and include ringing, busy and reorder signals. Such tones are deemed to be present when their energy exceeds a predetermined threshold.

The invention is improved by certain additional measurements made on the call progress tones themselves. One measurement examines the time duration of successive bursts of energy in the 200–700 Hz band, and when the most recent burst of energy has a duration substantially greater or less than the previous burst, called party answer is assumed. Another measurement examines the "quiet" duration between successive bursts of energy in the 200–700 Hz band, and when the quiet duration does not fall within a predetermined range, called party answer is assumed.

In order to prevent calling party signal energy (sidetone) from interfering with the detection of call progress tones via the network hybrid circuit, a filter is provided for removing signal energy in the 200–700 Hz frequency band from the calling party transmission path. Switch means are provided for bypassing the filter when called party answer is detected.

BRIEF DESCRIPTION OF THE DRAWING

FIG. 15 discloses the interconnection of the detailed schematic drawing shown in FIGS. 2–5.

DETAILED DESCRIPTION

Figure 1:
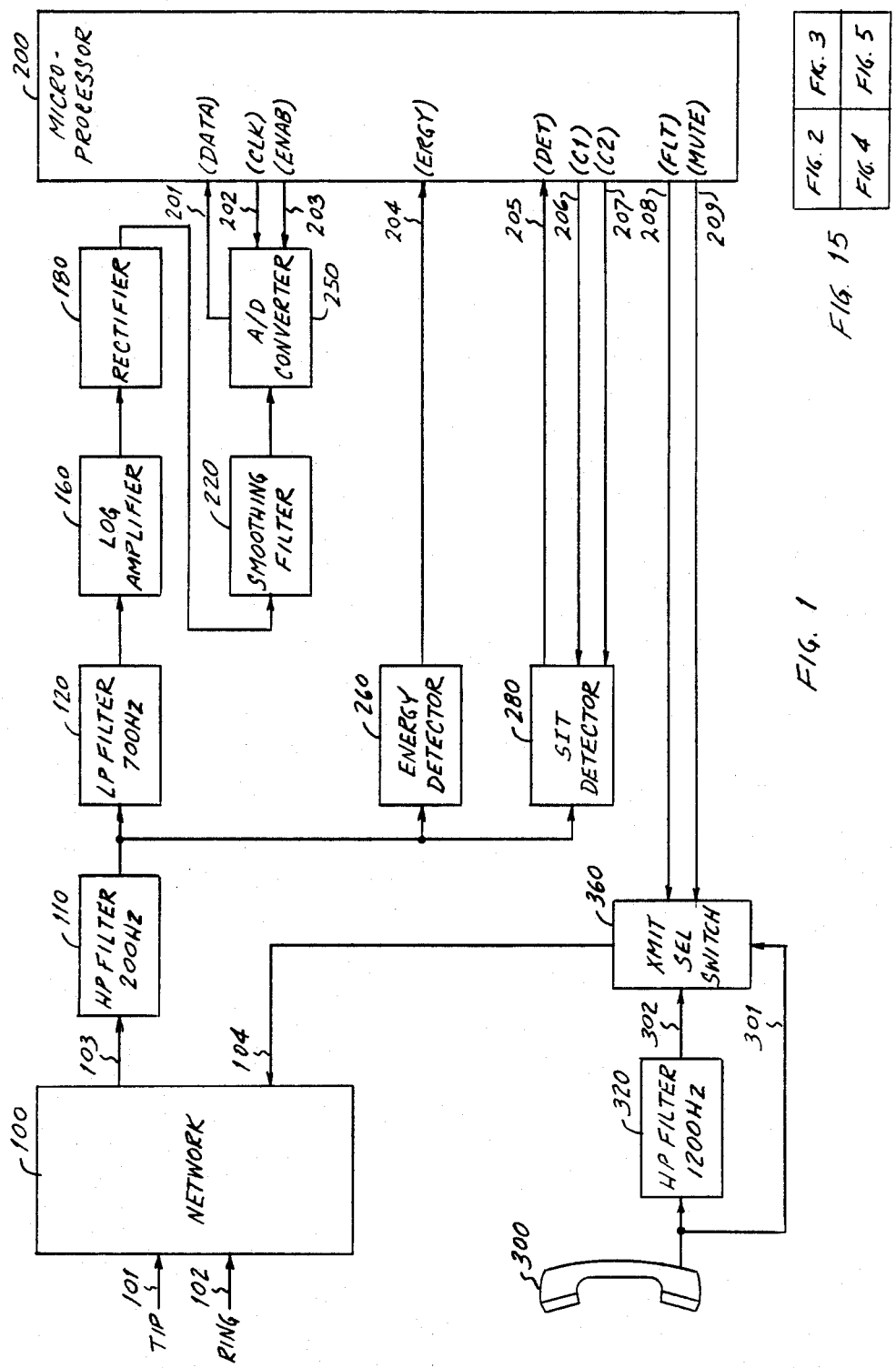
FIG. 1 discloses a block diagram of answer detection hardware in accordance with the invention.
Figure 2:
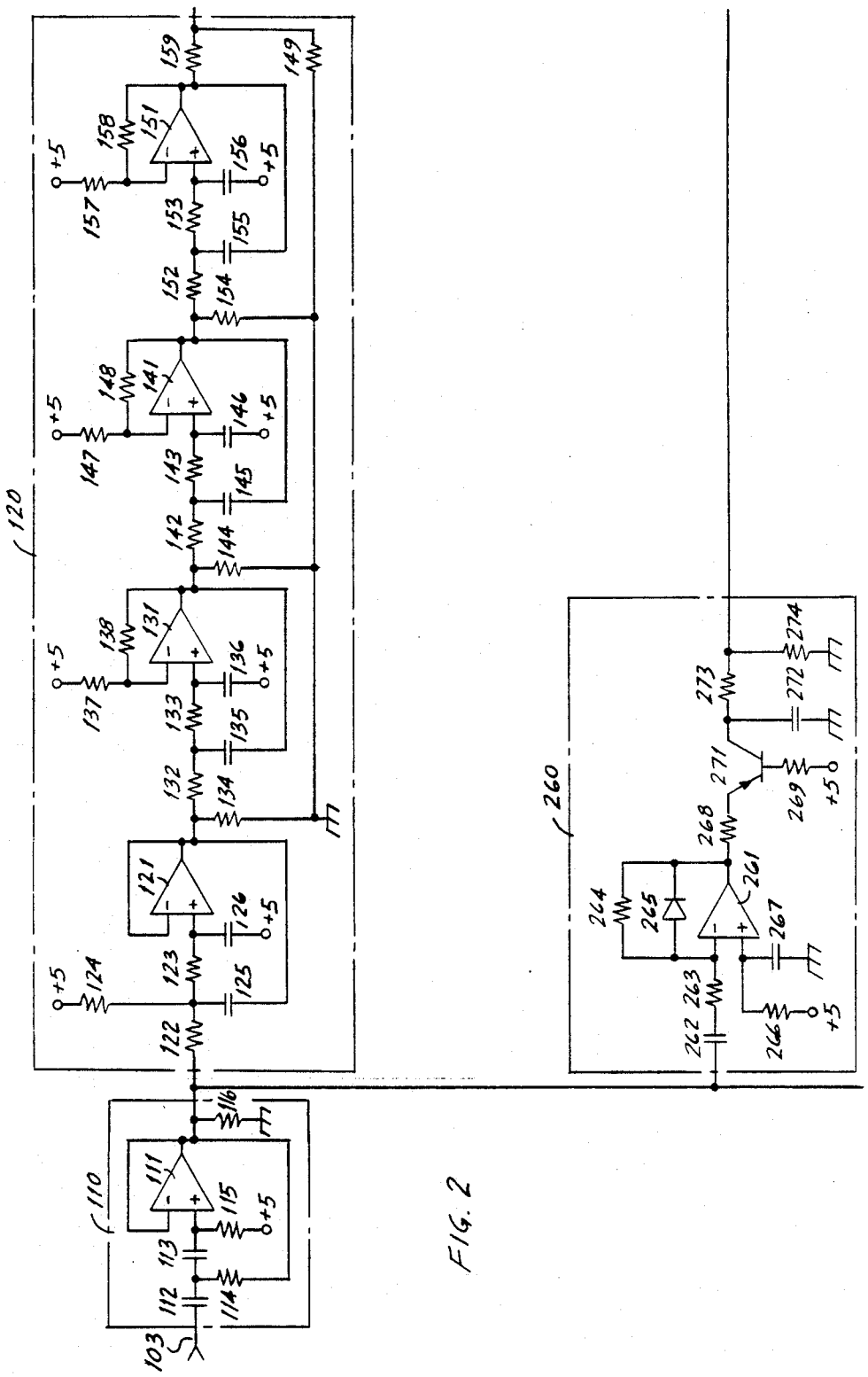
FIGS. 2–5 disclose a detailed schematic drawing of apparatus required to implement the answer detection system when connected in accordance with FIG. 15.
Figure 3:
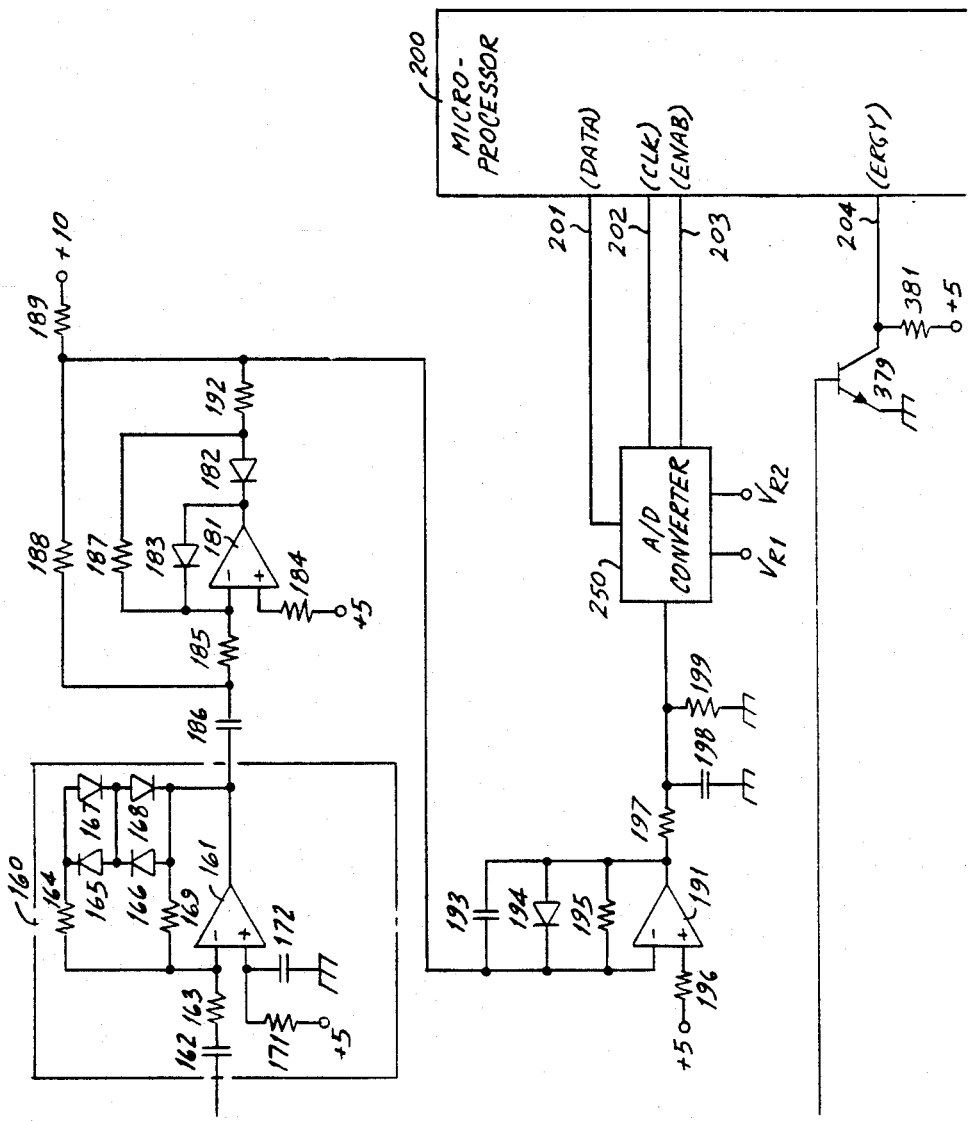
Figure 4:
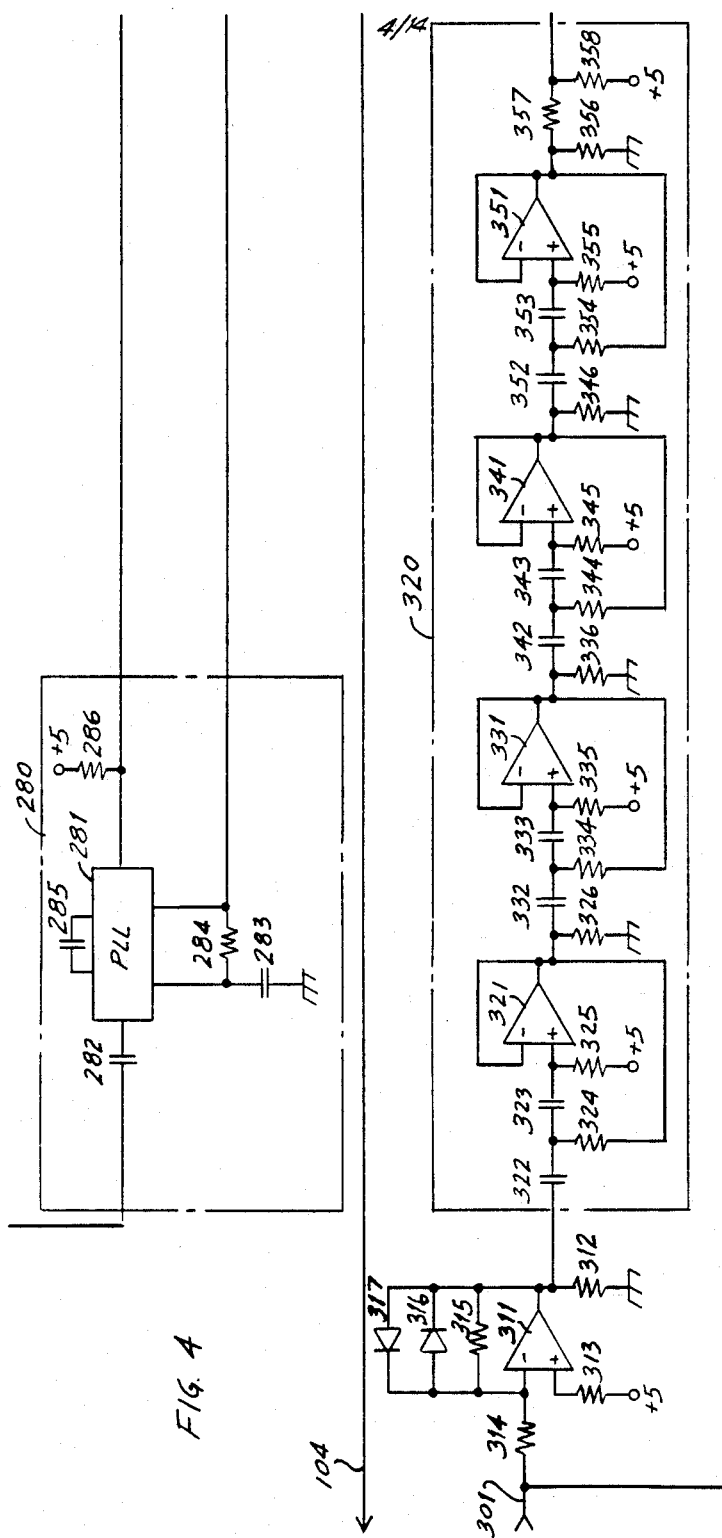
Figure 5:
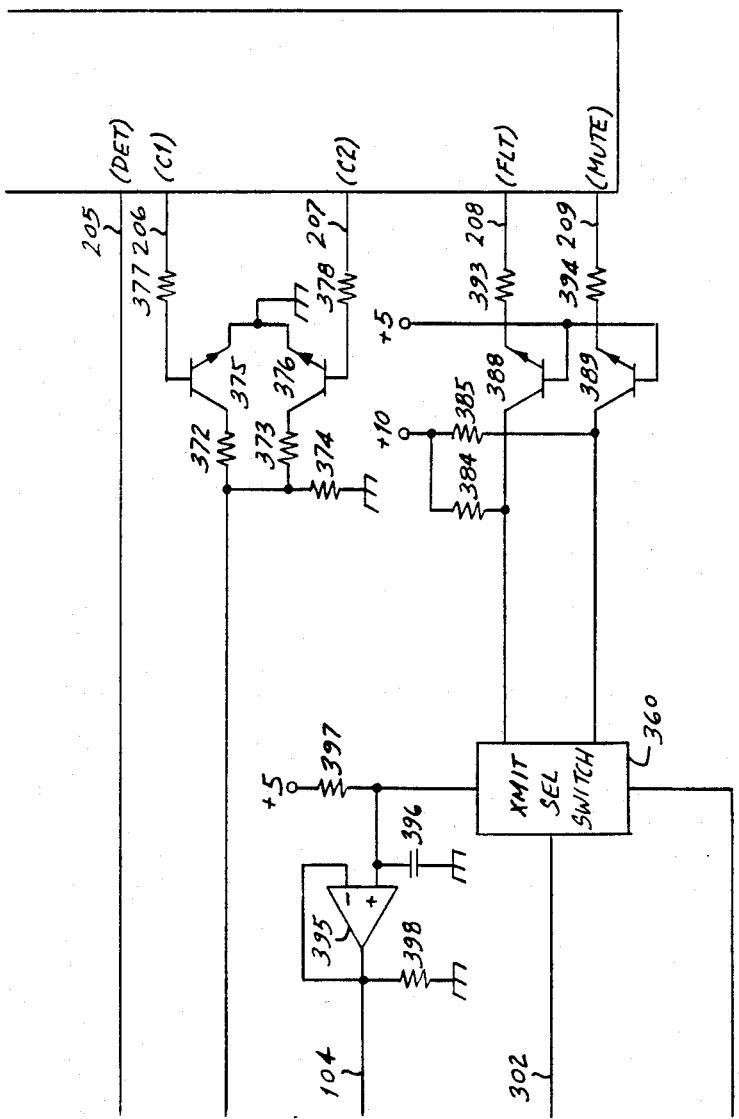

Referring now to FIG. 1 there is disclosed a block diagram that illustrates the answer detection architecture used in implementing the present invention. The apparatus disclosed is conventionally encased within a Customer Owned Coin Telephone (COCT) set. Network 100 is a well known hybrid circuit that provides two-wire to four-wire conversion. Tip and ring wires 101, 102 interconnect the disclosed telephone set with a telephone switching office. Network 100 steers receive signals on input wires 101, 102 to output line 103 for processing. Block 110 is a high-pass filter section that passes frequencies higher than 200 Hz while attenuating signals below that frequency. Block 120, on the other hand, is a low-pass filter, having a cutoff frequency of approximately 700 Hz, which cooperates with high-pass filter 110 to pass frequencies between 200 Hz and 700 Hz to blocks 160, 180, 220 and 250. The above-identified blocks cooperate to measure energy in the band 200–700 Hz and provide an output to microprocessor 200 on lead 201 to indicate the presence or absence of signal energy within this band. Due to the large dynamic range of signals being detected, a logarithmic amplifier 160 is used to compress a large amplitude range into a smaller one at its output. Rectifier 180 provides a DC voltage proportional to the signal amplitude at its input, and smoothing filter 220 removes abrupt changes in the signal level while Analog/Digital (A/D) converter 250 provides a sequence of eight binary digits at its output lead 201 indicative of the DC voltage level at its input. This information forms a portion of what is needed by the microprocessor in making a decision as to whether a valid answer has occurred at the distant end.

Another portion of the information needed by the microprocessor comes from a measurement of all energy above 200 Hz. Toward this end, energy detector 260 is responsive to the output of high-pass filter 110 for making such measurements and providing same to microprocessor 200 over line 204.

Another piece of information used by microprocessor 200 in determining whether a valid answer has been detected is the detection of Special Information Tones (SIT). The SIT event is the occurrence of three properly sequenced tones of specific frequency. This sequence precedes calls intercepted by the Telephone Company. If an SIT occurs, the coin telephone user is not to be charged for the call. Detector 280 searches for the sequence of three tones at the output of high pass filter 110. The detector is conditioned to respond to a first predetermined tone, which event is presented to microprocessor 200 over line 205. Thereafter, microprocessor 200, over control lines 206, 207, causes SIT detector 280 to respond to the second and subsequently the third tone of the predetermined sequence. Microprocessor 200 is thus provided with sufficient information to make an accurate determination as to when it is appropriate to commence billing. The TMS 7000, available from Texas Instruments, is a suitable microprocessor for use in connection with the present invention.

For various reasons including the elimination of fraud and avoiding the contamination of the signal energy received, it is desirable to control the signal energy that passes from handset 300 into network 100 until valid answer detection has occurred. Transmit select switch 360 is therefore responsive to input signals from leads 208 and 209 from microprocessor 200 for controlling signals presented to hybrid network 100. In one state, no signals are transmitted from handset 300 to hybrid network 100; in another state all signals are transmitted; and in a third state only signal energy above 1200 Hz is transmitted from handset 300 into hybrid network 100.

In terms of a brief summary, then, there are three basic elements in the answer detection algorithm:

1. Call progress tone and voice detection within the 200–700 Hz band;
2. SIT detection; and
3. Energy detection over the entire voice band.

Each of these elements perform in parallel and will be described with greater particularity in connection with the detailed description of the schematic diagram of FIGS. 2–5 connected in accordance with FIG. 15.

Continuing the overview, however, microprocessor 200 samples each of the detectors every 20 msec. Inputs to and from the microprocessor occur at the appropriate logic levels and buffer circuits are provided for this task. The actual operation of the microprocessor is disclosed in the flow charts of FIGS. 6–14. These flow charts provide sufficient information for one of ordinary skill in the art of computer programming to control the interaction of microprocessor 200 with the hardware of FIGS. 2–5. Finally, it is noted that in the preferred embodiment of the present invention, hardware and software cooperate to achieve the greatest benefit at the least cost.

Referring now to FIGS. 2–5, high pass filter 110 is a 2-pole filter having frequency determining components 112–115 and unity gain operational amplifier 110 arranged to pass frequencies above 200 Hz. Signals received from the telephone network are thus filtered by filter 110 before presentation to SIT detector 280, energy detector 260, and the call progress tone detector whose input stage is low pass filter 120.

SIT detector 280 comprises hardware and software whose purpose is to detect a 3-tone sequence that usually precedes an intercept message. The SIT detection hardware includes phase locked loop 281 which is controlled by microprocessor 200 in accordance with the flow diagram of FIGS. 13–14. Phase locked loop 281 provides a binary signal to microprocessor 200 that indicates whether it is locked onto a tone. Phase locked loop 281 responds to signals as low as −40 dBm, whose frequency is within 150 Hz of a predetermined frequency. Microprocessor 200 samples phase locked loop 281 once every 20 msec and provides an indication that the SIT event has occurred upon completion of the following sequence of events:

| Minimum | Maximum | Event |
| --- | --- | --- |
| 10 | 21 | consecutive samples in which Tone #1 (950 Hz) is present |
| 0 | 4 | consecutive samples in which Tone #2 (1400 Hz) is absent |
| 10 | 21 | consecutive samples in which Tone #2 is present |
| 0 | 4 | consecutive samples in which Tone #3 (1800 Hz) is absent |
| 10 | 21 | consecutive samples in which Tone #3 is present |

Any violation of this sequence will reset SIT detector 280 for the beginning of an entirely new sequence. For a portion of the sequence the transmitter will be muted to insure that the sequence is emanating from the far end. Once an SIT sequence has been properly detected and identified the transmitter is muted for a 30 second interval, after which time the transmitter is unmuted and an answer condition is signaled.

Phase locked loop 281 is a conventional detector such as the XR2211 manufactured by Exar. Capacitor 285 is a precision capacitor that sets the center frequency of phase locked loop 281 in combination with resistors 372, 373, 374—depending on which resistors are grounded. Transistors 375, 376 are controlled by microprocessor 200 and used to ground associated resistors 372, 373 to select a particular frequency that phase locked loop 281 will respond to. Components 283, 284 are used to set loop damping while other components (not shown) are used to set other characteristics of the phase locked loop such as detection bandwidth and chatter. Resistor 286 is a pull-up resistor.

Broadband energy detector 260 is included to detect signals not perceived by the other detectors. Non-SIT signals above about 700 Hz, such as certain modem tones, will not be detected by the call progress tone detector but are indicative that the call has been answered. Broadband energy detector 260 indicates to the microprocessor over line 204 whether energy exists on the telephone line greater than about −40 dBm. Microprocessor 200 samples input line 204 once every 20 msec. Four hundred consecutive samples in which the presence of broadband energy is detected causes an answer indication to be generated in accordance with the algorithm disclosed in FIG. 12. However, if for any of the samples a call progress tone is also detected by the call progress tone detector, then energy detector 260 is reset and a new set of 400 consecutive samples is required.

Energy detector 260 includes operational amplifier 261 whose gain is controlled by the ratio of resistors 264, 263 and operates to provide high amplification to incoming signals from high-pass filter 110. Peaks of the amplified signals cause transistor 271 to turn on and charge capacitor 272. When capacitor 272 is sufficiently charged, transistor 379 saturates and drives line 204 low thereby indicating that energy is present at the input to energy detector 260. Diode 265 provides reverse breakdown protection for transistor 271, and components 266, 267 are used to provide a filtered reference voltage input for operational amplifier 261. Capacitor 262 provides DC isolation from other circuits but does not contribute significantly toward shaping the filter characteristic of the energy detector 260.

Turning now to the detection of energy in the critical band from 200–700 Hz where call progress tones such as ringing and busy reside, great care must be taken to avoid confusing these tones with speech. Elements of the present call progress energy detector include: a low-pass filter having a cutoff frequency of approximately 700 Hz; a logarithmic amplifier; an envelope detector comprising a rectifier and smoothing filter; and an A/D converter for interfacing with microprocessor 200. These elements are considered in order.

Low-pass filter 120 is a modified Chebyschev filter comprising four stages and having a total of eight poles. Each section includes a pair of R-C filters connected to the non-inverting input of an operational amplifier. Conventional operational amplifiers such as the LM 2902, available from National Semiconductor, are used in low-pass filter 120 and throughout FIGS. 2–5. These amplifiers utilize a 10 volt power supply.

Logarithmic amplifier 160 serves as a dynamic range compressor. The V-I characteristics of diodes 165, 166, 167 and 168 provide a logarithmic voltage-current ratio in the feedback of amplifier 161. The maximum gain of the amplifier is set by resistor 169 in combination with resistors 163, 149 and 159. The minimum gain occurs when the output signal of amplifier 161 forward biases the diodes and places resistor 164 in parallel with resistor 169. Resistor 171 and capacitor 172 provide a filtered reference voltage for amplifier 161. The operating range of logarithmic amplifier 160 extents from approximately −50 dBm to approximately 0 dBm.

Envelope detection is performed by a process of half wave rectification and addition of the half wave rectified signal to the original signal itself in such a manner that full wave rectification results. Half wave rectification is performed by amplifier 181 in combination with diodes 182 and 183. The half wave rectified signal is then additively combined with the original signal in amplifier 191 through resistors 192 and 188 respectively. Values for these resistors are precisely selected to achieve full wave rectification. Filtering of the full wave rectified signal, present at the output of amplifier 191, is performed by a two pole filter substantially comprising capacitors 193, 198 and resistors 197,199. The output voltage present at the input to A/D converter 250 varies from approximately 2 volts to approximately 5 volts as the input signal to logarithmic amplifier 160 varies from −50 dBm to 0 dBm. Diode 194 is used to protect the input to A/D converter 250 from high voltages that may occur during a strong input signal. Resistor 189 is a level shifting resistor which, in combination with the associated 10 volt power supply, lowers the DC output voltage of amplifier 191 by approximately 4 volts to accommodate the operating range of A/D converter 250.

Microprocessor 200 enables the operation of A/D converter 250 over line 203 and provides a clock signal over line 202. Reference voltages $V_{R1}$ and $V_{R2}$ are provided to the A/D converter to set the upper and lower limits of the A/D conversion range. The output data from the A/D converter is presented to microprocessor 200 over data line 201. A serial A/D converter such as the TLC 549, manufactured by Texas Instruments, for example, may be used.

Transmit select switch 360 determines which of three states are presented to the telephone network via a buffer network that includes operational amplifier 395. Under the control of microprocessor 200, transmit select switch 360 connects one of three possible output signals to the telephone network. In one state all output signals from the transmit switch are muted. This state is selected over line 209 through a buffer amplifier comprising transistor 389 and resistors 385, 394. In another state the full output of the telephone handset is connected to the telephone network, and in the third state only signals above 1200 Hz are connected. The latter two states are selected over line 208 through a buffer amplifier comprising transistor 388 and resistors 384, 393. The utility of the 1200 Hz high-pass filter is understood in the situation whereby the called party has answered but the detection algorithm is slow to respond. Here it is desirable to allow some communication to occur while precluding interference with call progress detection which involves frequencies in the 200–700 Hz frequency band. Signals delivered to high-pass filter 320 are constrained in amplitude by a limiter stage including operational amplifier 311 and diodes 316, 317 connected as a varistor. High-pass filter 320 includes four stages of filtering, each stage providing two poles whose frequencies are determined by the resistor/capacitor combinations 322-325, 332-335, 342-345, 352-355 at the non-inverting input terminals of operational amplifiers 321, 331, 341, 351 respectively. Resistors 326, 336, 346, and 356-358 provide correct bias and signal strength.

Figure 6:
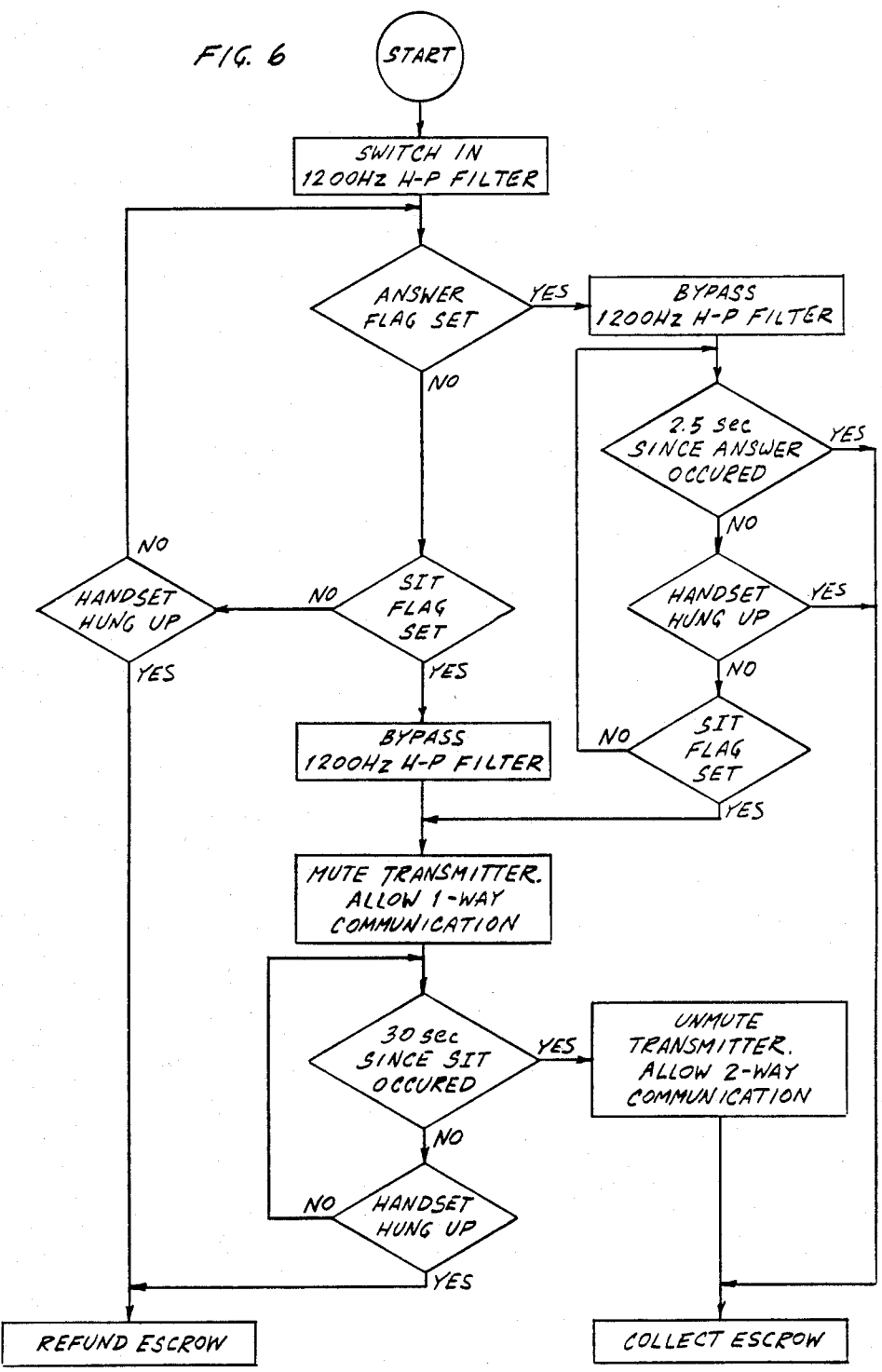
FIG. 6 discloses an overall flow diagram for a coin telephone charging system.

FIG. 6 outlines the overall operation of the microprocessor controlled system in terms of a flow diagram. FIG. 6 commences when a user goes off hook and deposits one or more coins into the COCT which are held in escrow until the called party answers. FIG. 6 thus discloses a charging algorithm which depends on the occurrence of three different events including answer detection, SIT detection, and the on-hook/off-hook condition.

The answer detection event occurs when a call is answered. This event can be determined by any one of four independent processes designated "Signal Duration", "Quiet Period", "Signal Classification", and "Broadband Energy Detection" algorithms. These algorithms are hereinafter described in FIGS. 7-8, 9-10, 11, and 12 respectively.

The SIT event is the occurrence of three properly sequenced tones of specific frequency. This sequence precedes calls interrupted by the Telephone Company. If an SIT event occurs, the coin telephone user is not charged for the call. The SIT event is determined by a "SIT Detection" algorithm set forth in the flow diagram of FIGS. 13-14.

Figure 7:
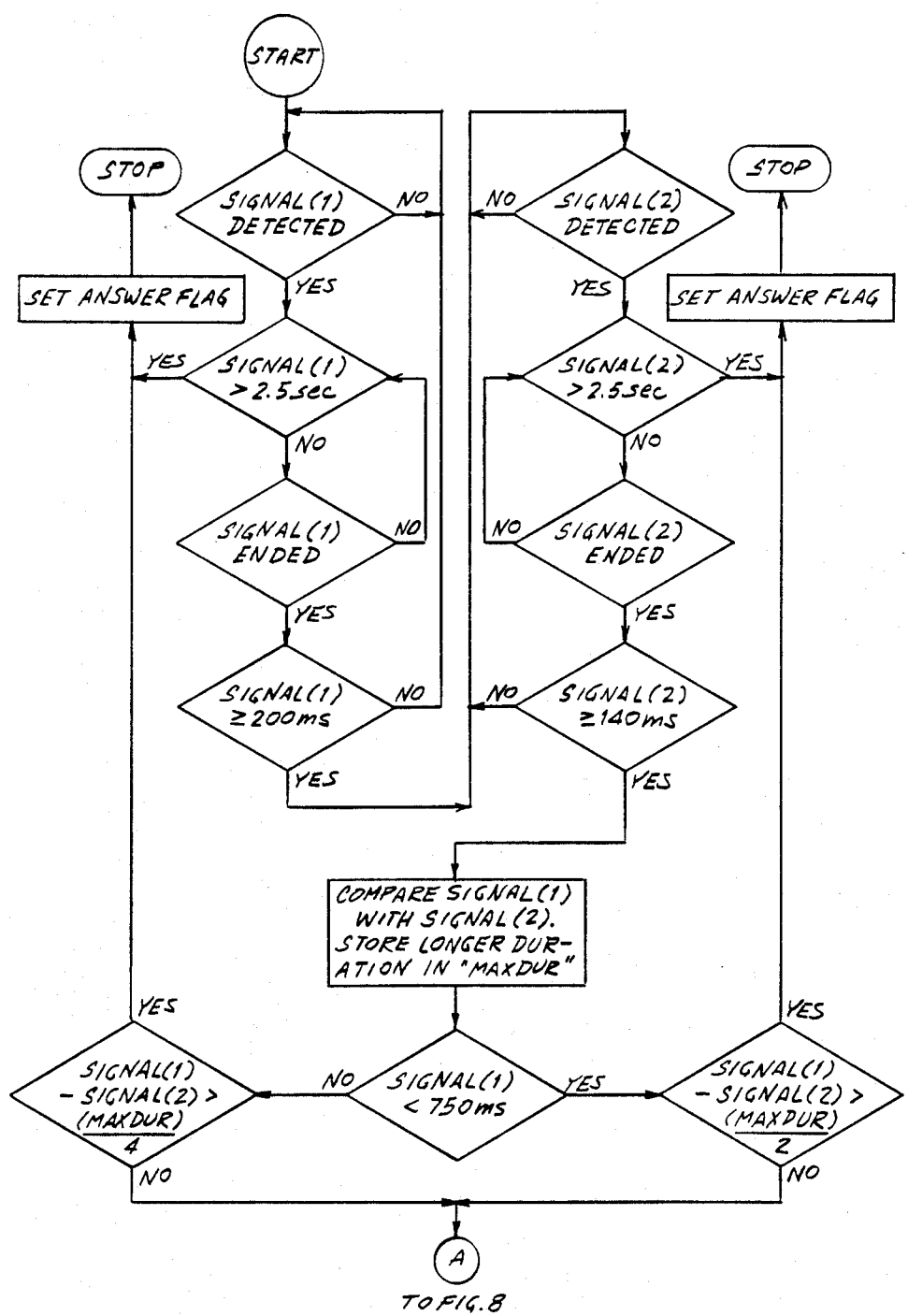
FIGS. 7–8 disclose a flow diagram for implementing a Constant Signal Duration algorithm using signal energy measurements in the 200–700 Hz frequency band.
Figure 8:
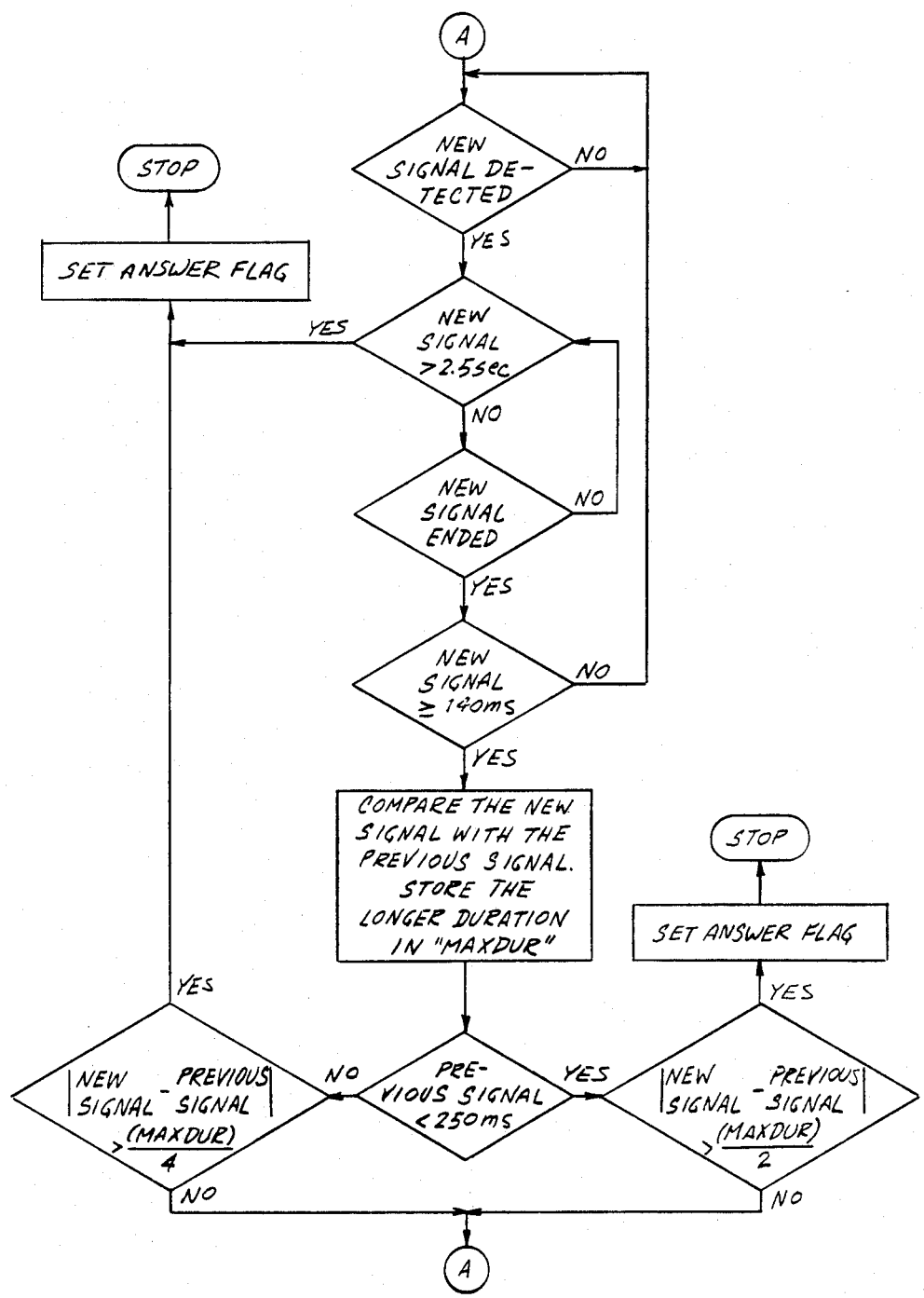

The Signal Duration algorithm, disclosed in FIGS. 7-8, measures the time duration of each burst of electrical energy in the 200-700 Hz band (Signal) and compares it with the time duration of the prior Signal. For short duration Signals (less than 750 msec), the difference between any two adjacent Signals can be no greater than 50 percent of the duration of the longer of the two. For longer duration Signals (greater than or equal to 750 msec), the difference allowed is only 25 percent. If the difference exceeds the above-stated limits, the answer event is assumed. An important exception to this rule occurs in the case where the two Signals being compared happened to be the first two Signals detected. In this situation, the first Signal may be only the tail end of a call progress tone and not a complete tone. Therefore, the second Signal is allowed to be longer than the first as long as it does not exceed the maximum allowed duration of 2.5 seconds.

Figure 9:
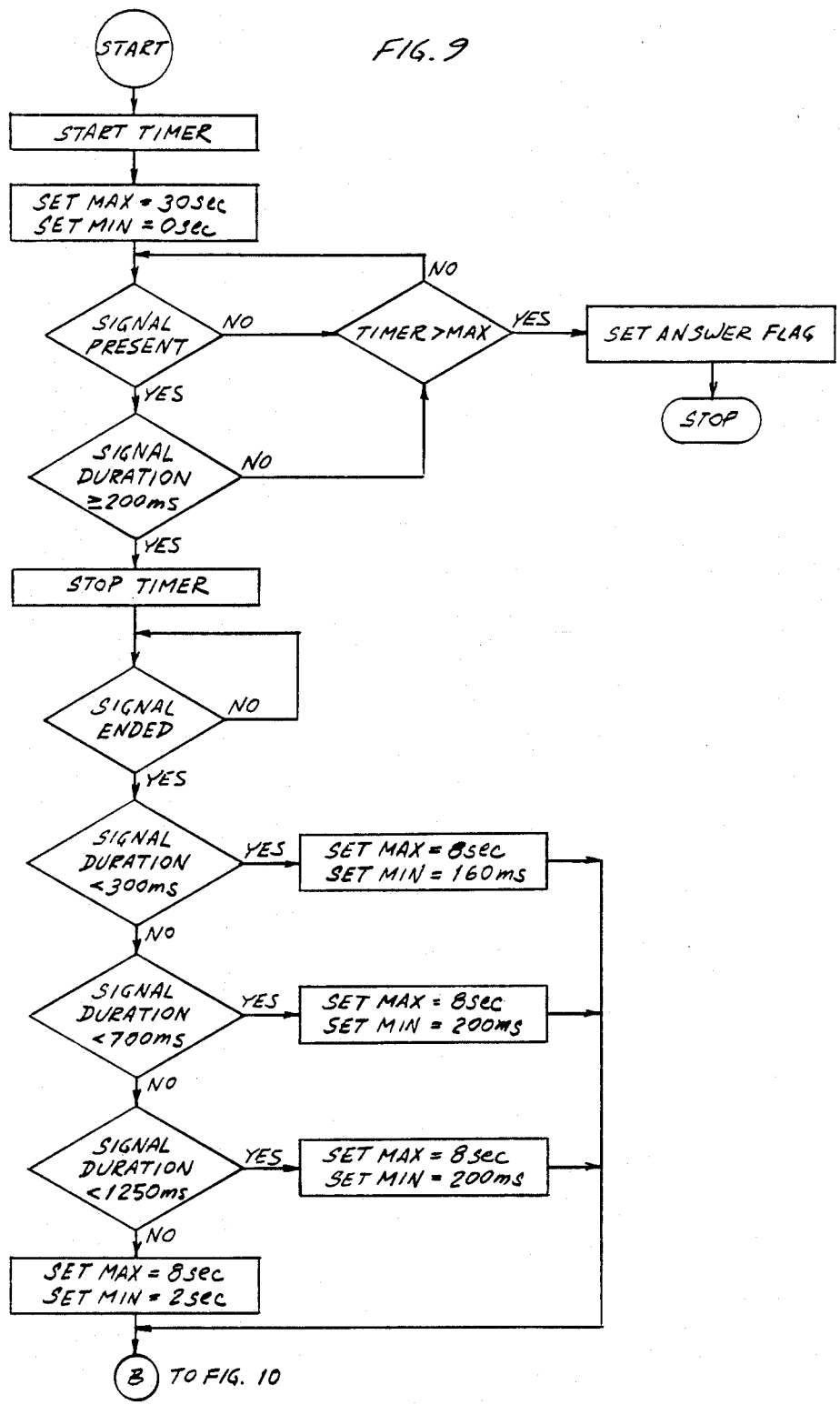
FIGS. 9–10 disclose a flow diagram for implementing a Quiet Period Measurement algorithm using signal energy measurements in the 200–700 Hz frequency band.
Figure 10:
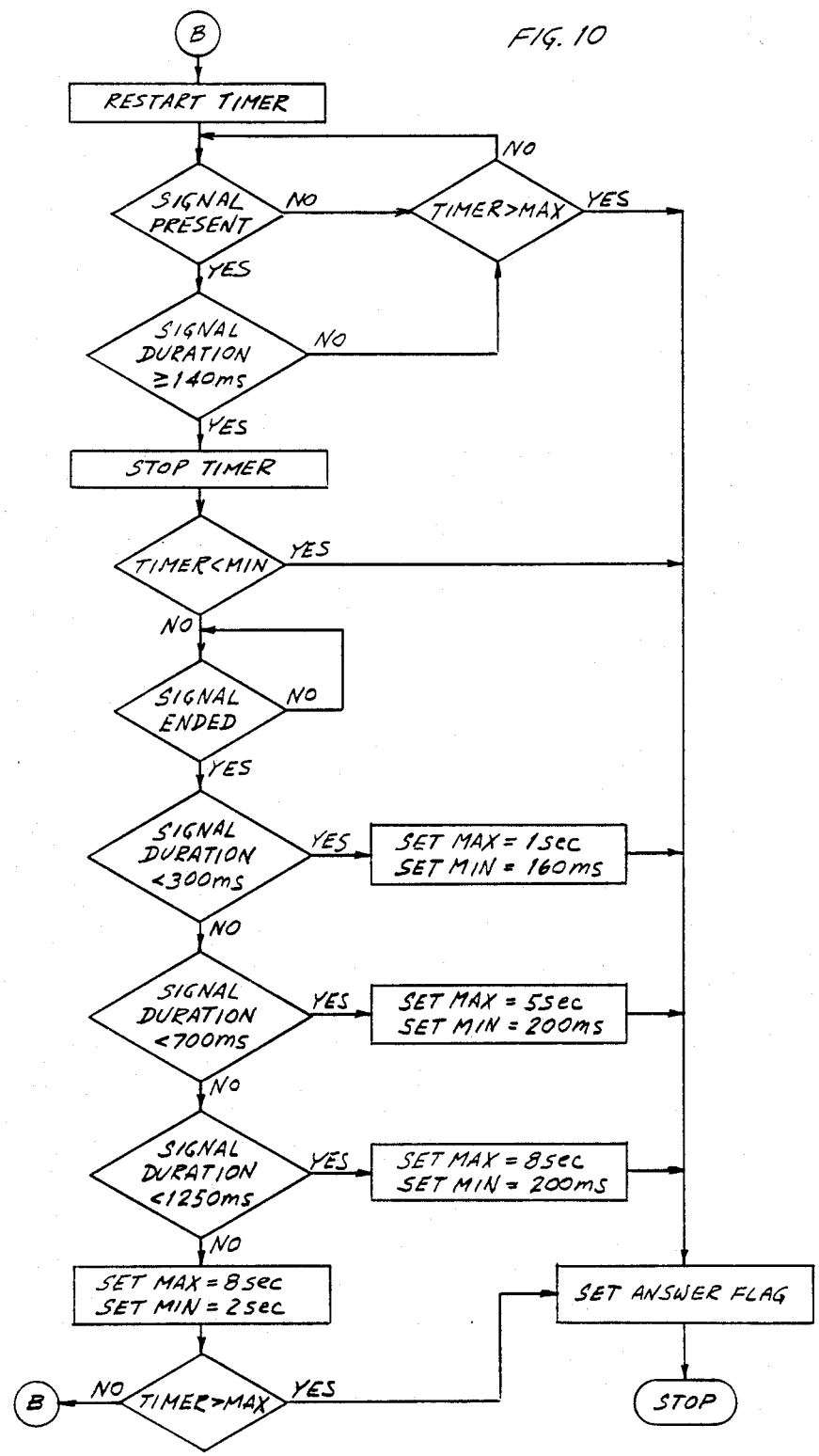

The Quiet Period algorithm disclosed in FIGS. 9-10 measures the time interval between Signals detected in the 200-700 Hz band. An answer is assumed if the quiet period is either too short or too long. The minimum and maximum quiet period duration limits are based on the duration of the Signals being detected. Because the first Signal can be an incomplete call progress tone (e.g., the tail end of an audible ring Signal), the maximum and minimum limits based on the first Signal are different than the limits based on all subsequent Signals.

During every quiet period, a continuous check is performed to determine if the maximum quiet period limit (MAX) has been reached. When every Signal is detected (except the first) the quiet period which has just ended is tested against the minimum quiet period limit (MIN). New MIN and MAX values are then chosen based on the duration of the Signal. Starting with the second Signal and thereafter, the quiet period which precedes this Signal is re-tested against the new MAX value based on the duration of that Signal. The algorithm then repeats by measuring the quiet period which follows the Signal (designated B on the flow diagram). This algorithm continues until a MAX or MIN limit is violated causing the answer flag to be set.

Figure 11:
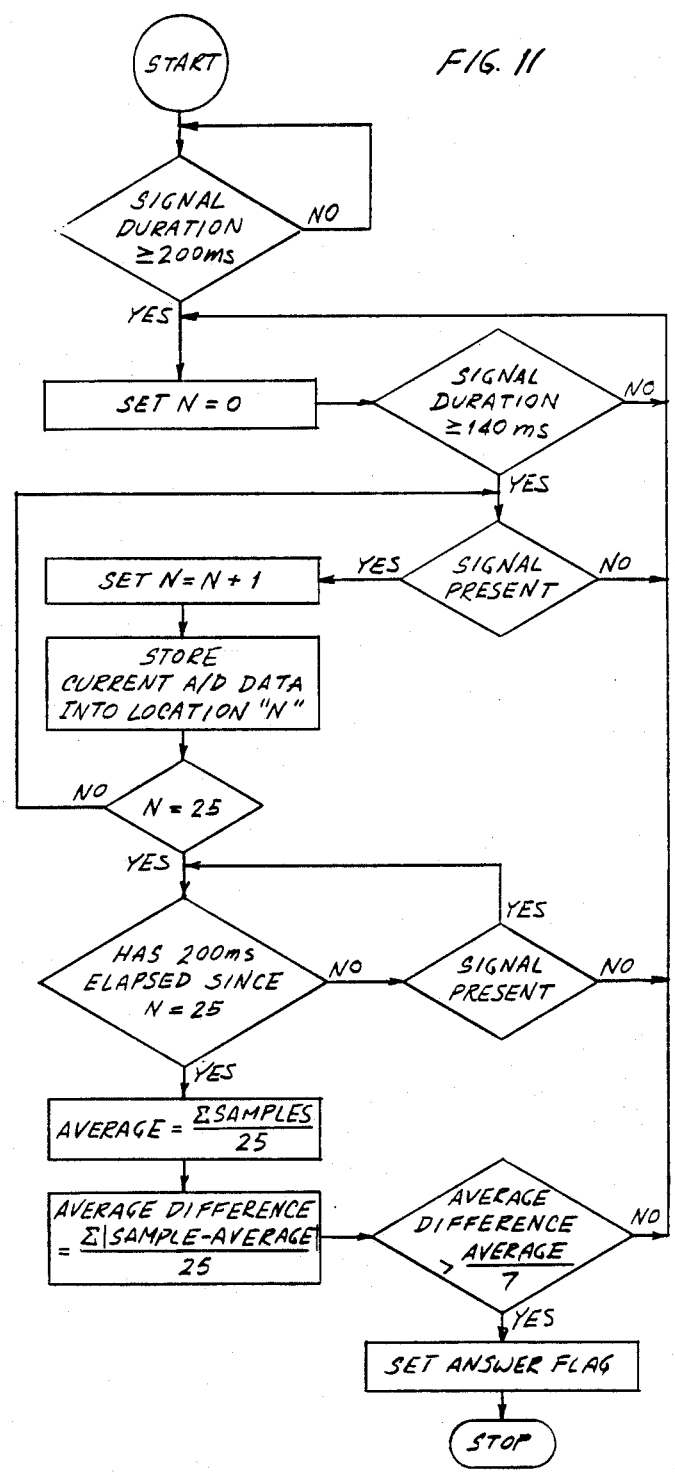
FIG. 11 discloses a flow diagram for implementing a Signal Classification algorithm using signal energy measurements in the 200–700 Hz frequency band.

The Signal Classification algorithm shown in FIG. 11 stores 0.5 seconds of amplitude data from A/D converter 250 in the memory of microprocessor 200. The first sample is stored after a Signal has been present for a time sufficient to insure that normal Signal transients have passed. This time is 200 msec for the first Signal and 140 msec for subsequent Signals. Twenty-five data samples (0.5 seconds) are stored as long as the Signal is present. The Signal must remain present for an additional 200 msec after the last sample is stored to insure that normal Signal decay and transients have passed. After the 200 msec requirement is met, the average amplitude of the Signal is then calculated. The average absolute difference of the Signal is calculated and compared to the average. If the average absolute difference is greater than approximately 15 percent, the Signal is assumed not to be a tone and the answer event is flagged.

Figure 12:
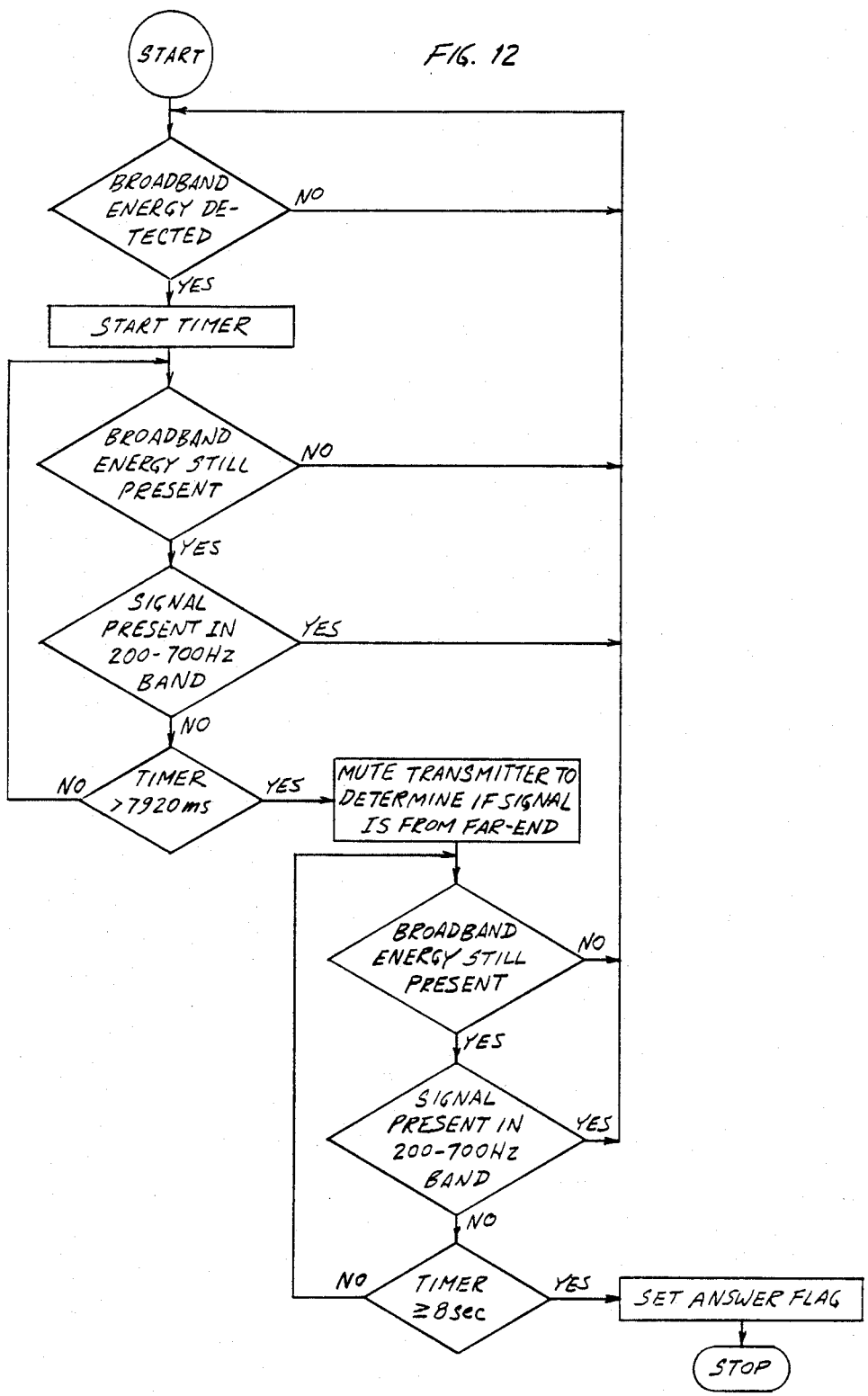
FIG. 12 discloses a flow diagram for implementing a Broadband Energy Detection algorithm using signal energy measurements above 200 Hz.

The Broadband Energy Detection algorithm is disclosed in FIG. 12 and responds to a binary signal level presented to the microprocessor on line 204 from broadband energy detector 260. The presence of broadband energy in excess of −40 dBm, approximately, starts a timer circuit. When the timer exceeds 7.92 seconds, the transmitter is muted to insure that the source of the energy being detected is from the telephone line and not the near-end transmitter. If the energy disappears, near-end energy is assumed to be the source and the algorithm is restarted. If the energy remains present without detection of energy in the 200-700 Hz band for another 80 msec, then the energy source is assumed to be from the far end and an answer flag is set. It is noted that energy detector 260 is responsive to all energy above 200 Hz including energy in the 200-700 Hz band. Thus, if the output of energy detector 260 indicates that energy is present at the same time a Signal is detected in the 200-700 Hz band by the call progress detector, then the output of broadband energy detector 260 is ignored.

Figure 13:
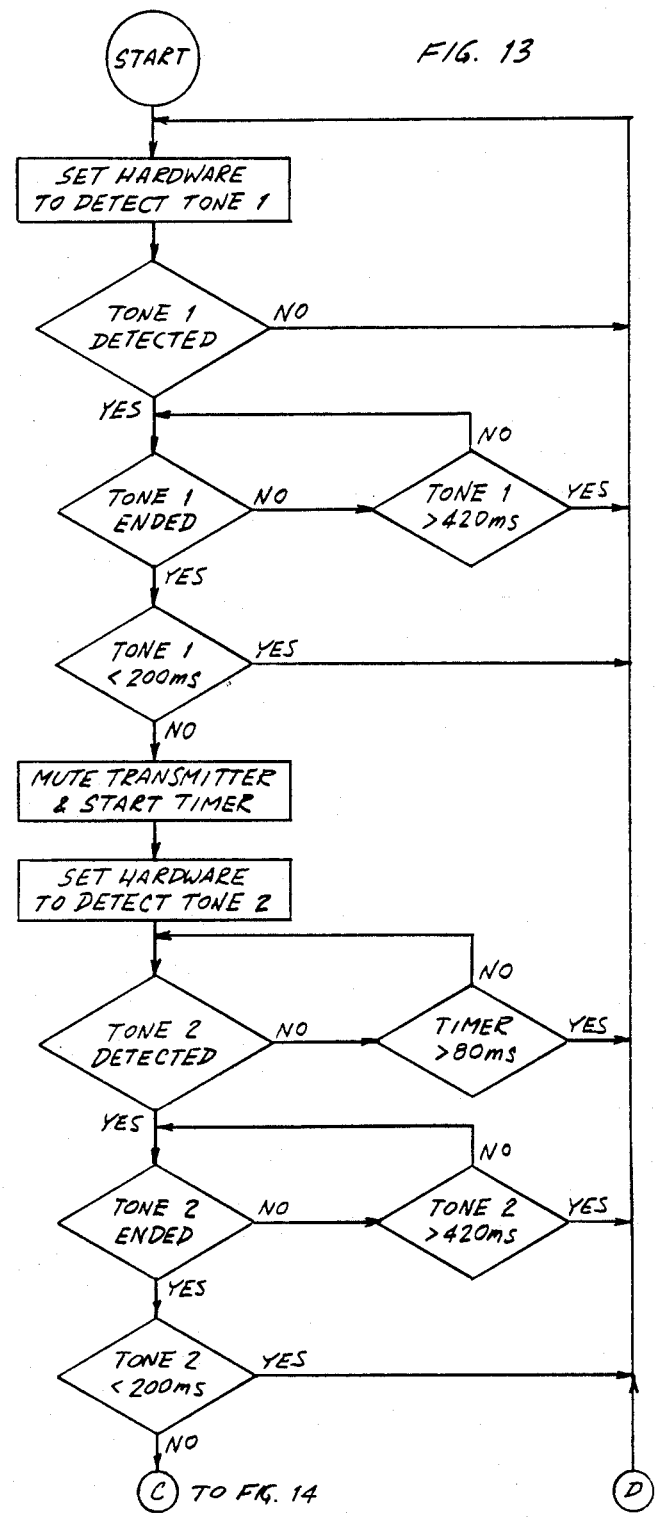
FIGS. 13–14 disclose a flow diagram for implementing a Special Information Tone Detection algorithm.
Figure 14:
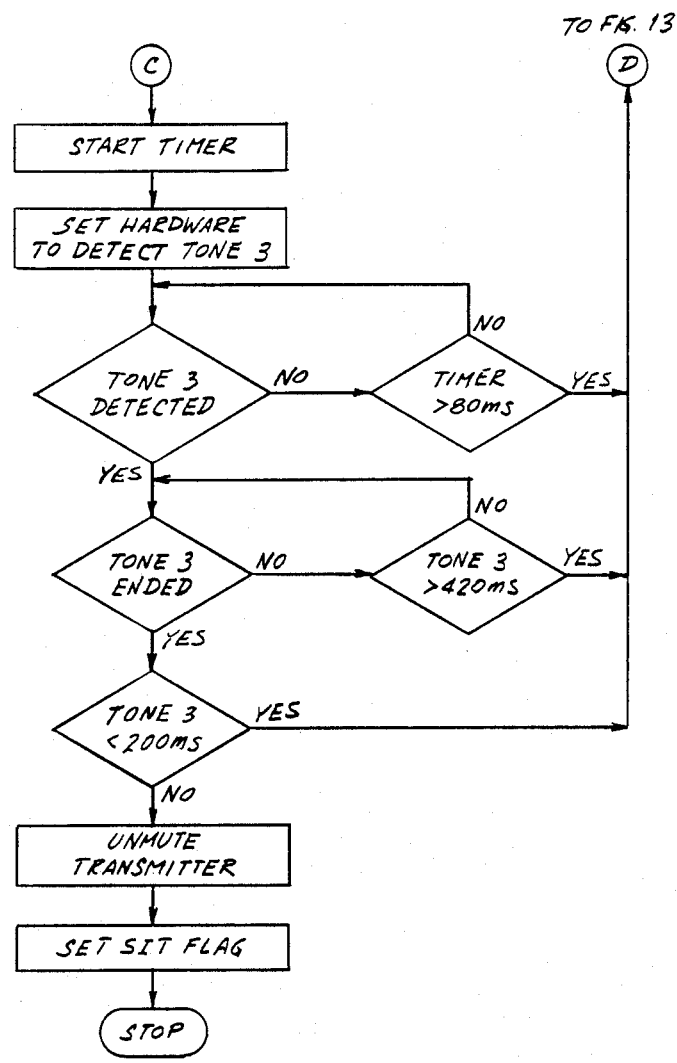

The SIT Detection algorithm is shown in the flow diagram of FIGS. 13-14. The SIT event comprises the reception of three separate and specific single tones. These tones follow one another in a predetermined sequence. Each tone must be present for at least 200 msec and must not exceed 420 msec. The break between each tone can range from 0-80 msec. The SIT detection hardware is initially set for the detection of tone #1 and subsequently set for the detection of tone #2 and then tone #3. In the event that any quiet period or tone limit is not met, the algorithm restarts.

SIT, as defined by the CCITT, consists of a sequence of three precise tone segments. The sequence is a low tone followed by a middle tone followed by a high tone having the following frequencies respectively: 950 Hz, 1400 Hz and 1800 Hz. Associated with each frequency is a +/−50 Hz tolerance and a duration of 330 +/−70 msec. A silent interval of up to 30 msec exists between successive tone segments.

What is claimed is:

1. In a telephone station including a 4-wire to 2-wire hybrid circuit interconnecting a transmitting microphone and a receiver circuit to a wire pair, apparatus for detecting that a called party has answered a call by measuring electrical energy present on the wire pair, said detecting apparatus including means responsive to the magnitude of the electrical energy, above a frequency of approximately 200 Hz and exceeding a first predetermined threshold, characterized by:
first means for inhibiting the indication of called party answer in response to the detection of a sequence of three predetermined tones; and
second means for inhibiting the indication of called party answer in response to the detection of energy exceeding a second predetermined threshold in the frequency band substantially between 200 Hz and 700 Hz.

2. The telephone station of claim 1 wherein the sequence of three predetermined tones have frequencies of 950 Hz, 1400 Hz, and 1800 Hz respectively.

3. The telephone station of claim 1 further characterized by:
high-pass filter means, interconnected between the transmitting microphone and the hybrid circuit, for attenuating electrical energy in the 200–700 Hz frequency band; and
transmit selection switch means, responsive to the detection of called party answer, for directly connecting the transmitting microphone to the hybrid network, whereby the high-pass filter is bypassed and normal conversation can ensue when call progress tones are not being monitored.

4. In a telephone station for connection to a telephone network by a wire pair, apparatus for indicating called party answer comprising:
energy detecting means, responsive to the magnitude of bursts of electrical energy on the wire pair in the frequency band substantially between 200 and 700 Hz exceeding a predetermined threshold, for indicating the presence of 200–700 Hz energy;
first timing means, responsive to said energy detecting means, for measuring the time duration of successive bursts of electrical energy in the 200–700 Hz band and providing an output signal when the time duration of one of the energy bursts is substantially greater than the time duration of a previously measured energy burst, provided that the previously measured energy burst is not the first burst of energy in the 200–700 Hz frequency band; and
answer indicating means, responsive to the output signal from the first timing means, for providing an indication of called party answer.

5. In a telephone station for connection to a telephone network by a wire pair, apparatus for indicating called party answer comprising:
energy detecting means, responsive to the magnitude of bursts of electrical energy on the wire pair in the frequency band substantially between 200 and 700 Hz exceeding a predetermined threshold, for indicating the presence of 200–700 Hz energy;
first timing means, responsive to said energy detecting means, for measuring the time duration of successive bursts of electrical energy in the 200–700 Hz band and providing an output signal when the time duration of one of the energy bursts is substantially less than the time duration of a previously measured energy burst; and
answer indicating means, responsive to the output signal from the first timing means, for providing an indication of called party answer.

6. The telephone station of claim 4 or 5 wherein the answer indicating means is further responsive to a quiet interval detector comprising:

means for measuring the time duration between successive bursts of energy in the 200–700 Hz frequency band whose magnitude exceeds the predetermined threshold; and
means for delivering an output signal to the answer indicating means to indicate called party answer when the time duration between successive bursts of energy is less than a first time duration or greater than a second time duration.

7. The telephone station of claim 6 further comprising means, responsive to the duration of one or more bursts of energy in the 200–700 Hz frequency band exceeding the predetermined threshold, for changing at least one of said first or second time durations, whereby accuracy in the answer detection process is enhanced by modifying the expected quiet interval in accordance with the particular call progress tone being received.

8. The telephone station of claim 4 or 5 wherein the answer indicating means is further responsive to a signal classification detector comprising:
means for periodically sampling the magnitude of the electrical energy present in the 200–700 Hz frequency band exceeding the predetermined threshold;
means for averaging the magnitudes of a predetermined number of said samples to determine average amplitude, said average amplitude being proportional to the sum of the individual amplitudes divided by the number of samples;
means for calculating an average difference between the individual amplitudes and the average amplitude, said average difference being proportional to the summation of the magnitudes of the differences between the individual amplitudes and the average amplitude divided by the number of samples; and
means for providing an output signal to the answer detecting means to indicate called party answer when the average difference exceeds a fixed threshold, whereby called party answer is determined by energy amplitude variations in the 200–700 Hz frequency band.

9. In a pay telephone station controlled by a microprocessor having one or more software programs for detecting called party answer, the telephone station being connected to a telephone network over a wire pair and including coin holding and storage apparatus, characterized by:
energy measurement means for providing an output signal to the microprocessor when electrical energy on the wire pair, in a frequency band between 200 Hz and 700 Hz, exceeds a predetermined threshold;
first timing means, responsive to the output signal from the energy measurement means, for calculating the time duration of said output signal;
means for storing one or more of the time durations calculated by the first timing means;
first software program means, responsive to the stored time durations for generating a called party answer signal when one of said time durations is at least 20% less than a prior time duration;
means for transferring coins from the coin holding apparatus to the coin storage apparatus in response to the called party answer signal.

10. The pay telephone station of claim 9 further characterized by:
second timing means, responsive to the output signal from the energy measurement means, for calculating the the time duration between successive output signals;

means for storing one or more of the time durations calculated by the second timing means; and second software program means, responsive to the stored time durations for generating a called party answer signal when one of said time durations calculated by the second timing means is greater than a predetermined maximum time limit or less than a predetermined minimum time limit.

11. The pay telephone station of claim 9 further characterized by:

means responsive to electrical energy in the frequency band substantially between 200 Hz and 700 Hz for calculating the magnitude of same and providing a digital signal, representative of said magnitude, to the microprocessor;

means for periodically sampling and storing the digital signal; and third software program means for (i) averaging the magnitudes of a predetermined number of said digital signals to determine average amplitude—said average amplitude being proportional to the sum of the individual amplitudes divided by the number of samples, (ii) calculating an average difference between the individual amplitudes and the average amplitude—said average difference being proportional to the summation of the magnitudes of the differences between the individual amplitudes and the average amplitude divided by the number of samples, and (iii) generating a called party answer signal when the average difference exceeds a fixed threshold.

12. In a telephone station for connection to a telephone network by a wire pair, a method for indicating called party answer comprising the steps of:

measuring the magnitude of bursts of electrical energy on the wire pair in the frequency band substantially between 200 Hz and 700 Hz;

calculating the time duration of the bursts of electrical energy in the 200–700 Hz frequency band whose magnitude exceeds a predetermined threshold; and generating a called party answer signal when the time duration of one of the bursts of electrical energy is at least 20% less than the time duration of a prior burst.

13. The method of claim 12 further comprising the steps of:

calculating the time duration between successive bursts of electrical energy in the 200–700 Hz frequency band whose magnitude exceeds the predetermined threshold; and generating a called party answer signal when the time duration between a pair of successive bursts is less than a predetermined minimum duration or greater than a predetermined maximum duration.

14. In a pay telephone station including a hybrid circuit for interconnecting a telephone network to a transmitting microphone and to a receiver circuit, a method for indicating called party answer comprising the steps of:

(i) measuring the magnitude of electrical energy delivered to the receiver circuit in the frequency range above approximately 200 Hz;

(ii) measuring the magnitude of electrical energy delivered to the receiver circuit in the frequency band substantially between 200 Hz and 700 Hz;

(iii) detecting a sequence of three tones on the wire pair at frequencies of 950 Hz, 1400 Hz, and 1800 Hz respectively; and (iv) generating a called party answer signal when the magnitude measured in step (i) exceeds a first predetermined threshold, unless the magnitude of energy measured in step (ii) exceeds a second predetermined threshold, or unless tones are detected in accordance with step (iii).

15. The method of claim 14 further including the steps of:

attenuating signals that emanate from the transmitting microphone in the 200–700 Hz frequency band; and disabling the 200–700 Hz attenuator subsequent to the generation of the called party answer signal.

* * * * *